(12) United States Patent
Pillai

(10) Patent No.: US 7,579,955 B2
(45) Date of Patent: Aug. 25, 2009

(54) DEVICE AND METHOD FOR SELECTIVE BACKSCATTERING OF WIRELESS COMMUNICATIONS SIGNALS

(75) Inventor: Vijay Pillai, Mukilteo, WA (US)

(73) Assignee: Intermec IP Corp., Everett, WA (US)

( * ) Notice: Subject to any disclaimer, the term of this patent is extended or adjusted under 35 U.S.C. 154(b) by 311 days.

(21) Appl. No.: 11/464,038

(22) Filed: Aug. 11, 2006

(65) Prior Publication Data

US 2008/0036605 A1    Feb. 14, 2008

(51) Int. Cl.
*G08B 13/14* (2006.01)
(52) U.S. Cl. .............. 340/572.4; 340/572.7; 340/572.1; 340/10.4
(58) Field of Classification Search .............. 340/572.7, 340/572.4, 572.1, 10.4
See application file for complete search history.

(56) References Cited

U.S. PATENT DOCUMENTS

| | | | |
|---|---|---|---|
| 836,531 A | 11/1906 | Pickard | |
| 837,616 A | 12/1906 | Dunwoody | |
| 3,710,337 A | 1/1973 | Grant | 343/701 |
| 3,852,755 A | 12/1974 | Works et al. | 343/701 |
| 3,949,403 A | 4/1976 | Yoshida et al. | 343/225 |
| 4,080,603 A | 3/1978 | Moody | 343/712 |
| 4,344,184 A | 8/1982 | Edwards | 455/95 |
| 4,562,102 A | 12/1985 | Rabuse et al. | 428/43 |
| 4,742,567 A | 5/1988 | Ohe et al. | 455/277 |
| 4,816,839 A | 3/1989 | Landt | 343/795 |
| 4,853,705 A | 8/1989 | Landt | 343/803 |
| 4,915,519 A | 4/1990 | Afzali-Ardakani et al. | 400/120 |
| 5,047,860 A | 9/1991 | Rogalski | 358/198 |
| 5,075,691 A | 12/1991 | Garay et al. | 33/830 |
| 5,095,382 A | 3/1992 | Abe | 359/189 |
| 5,097,484 A * | 3/1992 | Akaiwa | 375/267 |
| 5,142,292 A | 8/1992 | Chang | 343/742 |
| 5,220,335 A | 6/1993 | Huang | 343/700 |
| 5,267,800 A | 12/1993 | Petteruti et al. | 400/88 |

(Continued)

FOREIGN PATENT DOCUMENTS

EP    0 595 549 A2    5/1994

(Continued)

OTHER PUBLICATIONS

U.S. Appl. No. 60/719,102, filed Sep. 21, 2005.

(Continued)

*Primary Examiner*—Daniel Wu
*Assistant Examiner*—Hongmin Fan
(74) *Attorney, Agent, or Firm*—Seed IP Law Group PLLC

(57) ABSTRACT

A radio frequency identification (RFID) device with two or more antennas may select one antenna to backscatter or otherwise transmit, while deriving power from receipt of a carrier wave at one or more other antennas. The RFID device may select the antenna receiving the lower power or producing the lower voltage to transmit. The RFID device may select the antenna receiving the higher power or producing the higher voltage to transmit if the lower power or voltage is insufficient to operate the RFID device to backscatter or transmit. The RFID device may select neither antenna to transmit if the higher power or voltages are insufficient to operate the RFID device to backscatter or transmit.

30 Claims, 4 Drawing Sheets

U.S. PATENT DOCUMENTS

| | | | |
|---|---|---|---|
| 5,382,784 A | 1/1995 | Eberhardt | 235/472 |
| 5,430,441 A | 7/1995 | Bickley et al. | 340/825.54 |
| 5,448,110 A | 9/1995 | Tuttle et al. | 257/723 |
| 5,466,501 A | 11/1995 | Logan et al. | 428/40 |
| 5,497,701 A | 3/1996 | Uland | 101/288 |
| 5,499,397 A | 3/1996 | Wadin et al. | 455/277.1 |
| 5,554,974 A | 9/1996 | Brady et al. | 340/572 |
| 5,560,293 A | 10/1996 | Boreali et al. | 101/288 |
| 5,565,847 A | 10/1996 | Gambino et al. | 340/572 |
| 5,566,441 A | 10/1996 | Marsh et al. | 29/600 |
| 5,712,643 A | 1/1998 | Skladany | 343/700 MS |
| 5,729,201 A | 3/1998 | Jahnes et al. | 340/572 |
| 5,782,496 A | 7/1998 | Casper et al. | 283/81 |
| 5,786,626 A | 7/1998 | Brady et al. | 257/673 |
| 5,812,065 A | 9/1998 | Schrott et al. | 340/825.54 |
| 5,840,657 A | 11/1998 | Mehta et al. | 503/204 |
| 5,842,118 A | 11/1998 | Wood, Jr. | 455/101 |
| 5,923,305 A | 7/1999 | Sadler et al. | 343/895 |
| 5,942,987 A | 8/1999 | Heinrich et al. | 340/825.54 |
| 5,972,156 A | 10/1999 | Brady et al. | 156/280 |
| 5,973,598 A | 10/1999 | Beigel | 340/572.1 |
| 5,973,600 A | 10/1999 | Mosher, Jr. | 340/572.8 |
| 5,982,904 A | 11/1999 | Eghtesadi et al. | 381/74 |
| 5,993,093 A | 11/1999 | Schoennauer et al. | 400/621 |
| 6,019,865 A | 2/2000 | Palmer et al. | 156/265 |
| 6,078,259 A | 6/2000 | Brady et al. | 340/572.7 |
| 6,118,379 A | 9/2000 | Kodukula et al. | 340/572.8 |
| 6,123,796 A | 9/2000 | Kathmann et al. | 156/249 |
| 6,180,198 B1 | 1/2001 | Bond | 428/43 |
| 6,210,515 B1 | 4/2001 | Boreali et al. | 156/250 |
| 6,243,013 B1 * | 6/2001 | Duan et al. | 340/572.7 |
| 6,246,326 B1 | 6/2001 | Wiklof et al. | 340/572.1 |
| 6,259,372 B1 | 7/2001 | Taranowski et al. | 340/683 |
| 6,278,413 B1 | 8/2001 | Hugh et al. | 343/818 |
| 6,327,972 B2 | 12/2001 | Heredia et al. | 101/35 |
| 6,371,375 B1 | 4/2002 | Ackley et al. | 235/462.45 |
| 6,409,401 B1 | 6/2002 | Petteruti et al. | 400/88 |
| 6,570,386 B2 | 5/2003 | Goldstein | 324/415 |
| 6,585,437 B1 | 7/2003 | Wiklof et al. | 400/621 |
| 6,593,853 B1 | 7/2003 | Barrett et al. | 340/572.1 |
| 6,664,897 B2 | 12/2003 | Pape et al. | 340/573.3 |
| 6,899,476 B1 | 5/2005 | Barrus et al. | 400/76 |
| 2006/0022801 A1 | 2/2006 | Husak et al. | |
| 2006/0267731 A1 | 11/2006 | Chen | |
| 2007/0024423 A1 | 2/2007 | Nikitin et al. | |
| 2007/0194929 A1 * | 8/2007 | Wagner et al. | 340/572.7 |
| 2007/0229261 A1 | 10/2007 | Zimmerman et al. | |
| 2008/0011822 A1 | 1/2008 | Ackley et al. | |

FOREIGN PATENT DOCUMENTS

| | | |
|---|---|---|
| EP | 0 718 912 A1 | 6/1996 |
| JP | 11-221948 | 8/1999 |
| WO | 2007/035863 A2 | 3/2007 |

OTHER PUBLICATIONS

U.S. Appl. No. 60/830,020, filed Jul. 11, 2006.
U.S. Appl. No. 60/834,314, filed Jul. 28, 2006.
"Technical Specification: Aircraft—Integrated Data Processing Materials Management—Bar Coding," ISO/TS 21849, First Edition, Jul. 1, 2003.
"AXCESS: Radio Frequency Identification Overview," http://www.axcessinc.com/prod_rfidoverview.php, download date Sep. 13, 2006, pp. 1-3.
"Information Technology—Radio Frequency Identification for Item Management: Part 6: Parameters for Air Interface Communications at 860 MHz to 960 MHz," ISO/IEC 18000-6, First Edition, Aug. 15, 2004.
"Information Technology: Transfer Syntax for High Capacity ADC Media," International Standard ISO/IEC 15434, First Edition, Oct. 1, 1999.
Kirman et al., "Stochastic Communication and Coalition Formation," Econometrica, vol. 54, No. 1, Jan. 1986, pp. 129-138.
"Radio-Frequency Identification of Animals—Code Structure," ISO 11784, Second Edition, Aug. 15, 1996.
"Radio-Frequency Identification of Animals—Code Structure—Amendment 1," ISO 11784, Second Edition, Aug. 15, 1996, Amendment 1, Nov. 15, 2004.
"Radio-Frequency Identification of Animals—Technical Concept," ISO 11785, First Edition, Oct. 15, 1996.
"Smart Dust: Autonomous sensing and communication in a cubic millimeter," http://robotics.eecs.berkely.edu/~pister/SmartDust/, downloaded date Sep. 13, 2006, pp. 1-6.
K.V. Rao et al., "Antenna Design for UHF RFID Tags: A Review and a Practical Application," *IEEE Transactions on Antennas and Propagation*, vol. 53, No. 12, Dec. 2005, pp. 3870-3876.
Straw, R., et al., *The ARRL Handbook—For Radio Amateurs*, 76$^{th}$ ed., The American Radio Relay League, Newington, CT, 1999, chapter 20, "Antennas & Projects," pp. 20.31-20.37.
"International Technical Standard: Extended Channel Interpretations: Part 1: Identification Schemes and Protocol," AIM Publication ITS/04-001 (May 24, 2004).
"International Symbology Specification—93i," AIM Publication ITS/99-004, Nov. 5, 1999.
"Information Technology—Automatic Identification and Data Capture Techniques—Bar Code Symbology Specifications," International Standard ISO/IEC 15438, First Edition, Sep. 15, 2001.

* cited by examiner

DEVICE AND METHOD FOR SELECTIVE BACKSCATTERING OF WIRELESS COMMUNICATIONS SIGNALS

BACKGROUND

1. Field

This disclosure generally relates to RFID (Radio Frequency Identification) devices and methods useful in backscattering of wireless communications signals.

2. Description of the Related Art

The automatic data collection (ADC) field is generally directed to the use of devices and methods for automatically capturing data typically encoded in media such as a tag or other data carrier carried by the item to which the data relates. A variety of ADC devices and ADC media are ubiquitous and well known.

For example, a data carrier may take the form of a radio-frequency identification (RFID) device, which may have the form of a tag, card, case, or other medium. Such are commonly referred to collectively as RFID tags without regard to particular form factor. RFID devices typically include an RFID substrate carrying a circuitry such as a semiconductor device including memory and one or more conductive traces that form an antenna.

Typically, RFID devices act as transponders, providing information stored in the semiconductor device in response to an interrogation signal received at the antenna from a reader or interrogator. The interrogation signal typically takes the form of a radio-frequency (RF) carrier wave signal without, or without, encoded information (e.g., modulated). The information may include a unique identifier of the RFID device, such as a unique serial number (e.g., alpha-numeric), and/or information (e.g., account, manufacturer, model, style, size, weight, price, color, etc.) about the item to which the RFID device is attached or otherwise associated.

Some RFID devices include security measures, such as requiring passwords to access data and/or employing encryption. Many RFID devices also permit information to be written or stored in the semiconductor memory via an RF signal. As used herein, radio-frequency communications include communications in any frequency band or range suitable for wireless communications, including those commonly referred to as the radio wavelength and the microwave wavelength portions of the electromagnetic spectrum.

RFID devices that include a discrete power source, for example a battery, are commonly referred to as active devices. RFID devices that rely on an RF signal to derive power are commonly referred to as passive devices, which typically employ modulation backscatter techniques. Some RFID devices may employ both active and passive power sources.

Identification of passive RFID devices generally depends on RF energy produced by a reader or interrogator arriving at the RFID device, which backscatters modulated RF energy to the interrogator. In general, lower frequencies can penetrate objects better than higher frequencies, but higher frequencies can carry more data than lower frequencies. In addition, multiple protocols exist for use with RFID devices. These protocols may specify, among other things, particular frequencies, frequency ranges, modulation schemes, security schemes, and data formats. Conventional approaches employ multiple RFID devices, each RFID device using a frequency band and protocol suited to a particular application.

Currently, there are passive RFID tags with multiple antennas that receive interrogation signals from a reader or interrogator via all the antennas. The RF voltage developed on the antennas is converted to DC voltage, thereby generating enough power for the RFID tag to power up and transmit a response. Transmitting the response takes the form of backscattering modulated interrogation signals via all the antennas. The RFID tag does not receive power via the antennas during backscattering, hence the power at the RFID tag drastically decreases. This disadvantageously reduces the time during which the RFID tag can continue functioning without receiving additional power via the antennas, as well as reducing the range of the RFID tag.

It is therefore desirable to have a passive or partially passive RFID device and method for backscattering modulated signals while simultaneously ensuring that the RFID device receives sufficient power to continue functioning with maximum range.

BRIEF SUMMARY OF THE INVENTION

In one embodiment, a radio frequency identification (RFID) device operable to derive power from a carrier wave source that is separate and distinct from the RFID device includes at least two antennas configured to receive carrier waves from the carrier wave source, and an RFID circuit including a passive power supply circuit configured to rectify at least some of the carrier waves received via the at least two antennas to provide power to the RFID circuit, the RFID circuit configured to select which of the at least two antennas to employ for outgoing transmissions, if any, based at least in part on an indication of an amount of power being received at the RFID device via respective ones of the antennas, and the passive power supply circuit further configured to modulate at least some of the carrier waves received via the at least two antennas with information and backscatter the modulated carrier waves via the selected one or more of the antennas, if any.

In another embodiment, a method of operating a radio frequency identification (RFID) device includes receiving carrier waves at a first and a second antenna of the RFID device, rectifying the received carrier waves to power the RFID device, selecting which of at least the first and the second antennas to employ for outgoing transmissions, if any, based at least in part on a number of values indicative of an amount of power being received at the RFID device via respective ones of at least the first and the second antennas, and backscattering a modulated carrier wave from the RFID device via the selected one of at least the first and second antennas, if any, the modulated carrier wave modulated with information stored in the RFID device.

In yet another embodiment, a radio frequency identification (RFID) device operable to derive power from a carrier wave source that is separate and distinct from the RFID device includes at least two antennas for receiving carrier waves from the carrier wave source, and means for modulating at least some of the carrier waves received via the at least two antennas with information, selecting which of the at least two antennas to employ for outgoing transmissions, if any, based on at least in part a number of values indicative of an amount of power being received at the RFID device via respective ones of the antennas, and backscattering the modulated carrier waves via the selected one or more of the antennas, if any.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the embodiments may be practiced without these details. In other instances, well-known structures, equipment and processes associated with radio frequency identification (RFID) devices, including antennas, passive power supply circuits, front-ends, memories, packaging and/or readers or interrogators have not been shown or described in detail to avoid unnecessarily obscuring the description.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combinable in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the claimed invention.

Figure 1:
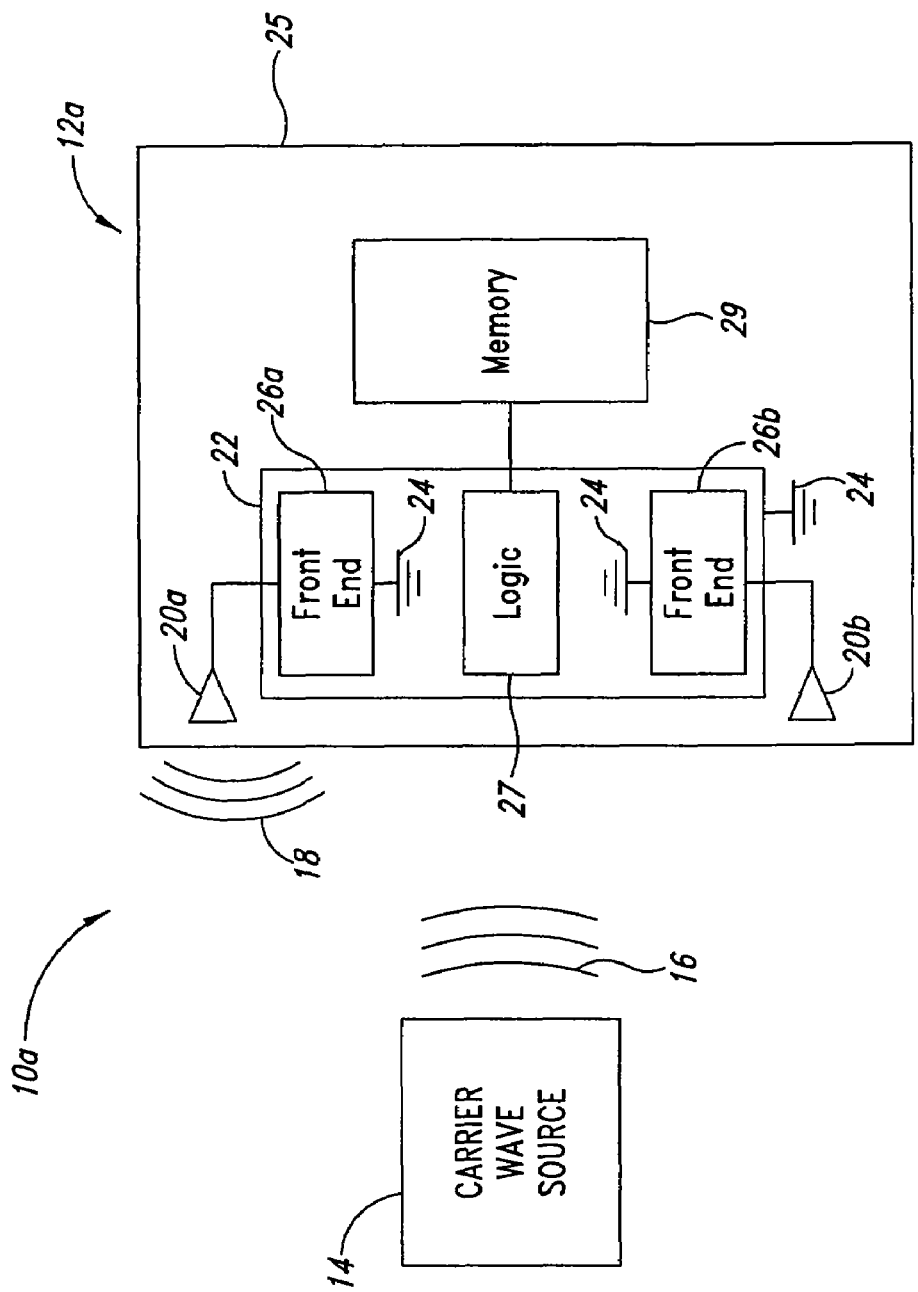
FIG. 1 is a schematic diagram of a radio frequency identification (RFID) system including an RFID device and a remotely located carrier wave source, according to one illustrated embodiment.

FIG. 1 shows an RFID system 10a comprising an RFID device 12a and a remotely located carrier wave source 14, according to one illustrated embodiment.

The carrier wave source 14 is operable to transmit carrier waves 16 which the RFID device 12a returns as carrier wave responses 18, according to one illustrated embodiment. In at least some embodiments, the RFID device 12a modulates and backscatters the carrier waves 16 received from the carrier wave source 14 as the carrier wave responses 18.

The carrier wave source 14 may take the form of an RFID reader or interrogator. RFID readers or interrogators are commercially available in the automatic data collection field (ADC), and are typically employed for reading and/or writing to RFID tags or labels. The carrier wave source 14 may transmit the carrier waves 16 as un-modulated carrier waves, or may transmit the carrier waves 16 as un-modulated carrier waves interspersed with modulated carrier waves.

The RFID device 12a comprises at least two antennas 20a, 20b (collectively 20) and an RFID circuit carried by a substrate 25. As discussed in more detail below, the RFID device 12a is operable to derive power from the carrier wave 16 transmitted by the carrier wave source 14, which is separate and distinct from the RFID device 12a.

Each of the at least two antennas 20 are configured to receive carrier waves 16 from the carrier wave source 14 and transmit the carrier wave responses 18 generated by the RFID circuit. Each of the antennas 20 may be shaped and otherwise configured to receive and/or transmit at or within a frequency range emitted by the carrier wave source 14. For example, the antennas 20 may have a serpentine shape, crenulated shape, coil or volute shape, or a dipole T-shape or dipole opposing L-shape. The antennas 20 may include more than one antenna element, for example one or more active antenna elements and/or one or more passive or parasitic antenna elements. Numerous suitable antenna shapes and structures are known in the RFID art.

A radio frequency (RF) voltage is produced across the leads of the respective antennas 20 upon receipt of the carrier waves 16. The RFID circuit includes a passive power supply circuit 22. As used herein and in the claims, the term "passive power supply circuit" and variations of such means a circuit that derives power via incident electromagnetic energy, such as energy from the radio frequency or microwave portions of the electromagnetic spectrum. The passive power supply circuit 22 may take the form of one or more integrated circuits or chips. Integrated circuits or chips suitable for use in some RFID applications are commercially available, for example from Intermec Technologies Corporation of Everett, Wash.; Avery-Dennison Corporation of Pasadena, Calif.; Hewlett-Packard Company of Palo Alto, Calif.; and Texas Instruments Incorporated of Dallas, Tex. to name a few.

The passive power supply circuit 22 may include one or more front ends 26 coupled to the antennas 20. For example, the passive power supply circuit 22 may include a respective front end 26a, 26b (collectively 26) for each of the antennas 20a, 20b, respectively. The front ends 26 may be electrically coupled to a common ground line 24. As is well known in the RFID arts, the front ends 26 are configured to rectify the RF voltage produced across the leads of the respective antenna 20 to provide power to the RFID device 12a. As is well known in the RFID arts, the front ends 26 are configured to modulate the carrier wave responses 18, for example via load modulation for near field applications or varying the impedance of the respective antenna 20 for far field applications such as when providing the carrier wave responses 18 via backscattering.

As discussed in more detail below, the passive power supply circuit 22 may include logic 27 configured to select between one of the at least two antennas 20, or to select neither antenna 20, based at least in part on an amount of power being received by the respective antennas 20. The amount of power may, for example, be represented or otherwise indicated by a voltage, current or power received by the antenna 20 or provided by the respective front end 26 in response to the receipt of the carrier waves 16. As discussed in more detail below, the logic 27 permits the RFID device 12*a* to backscatter or otherwise transmit via the selected antenna 20, while receiving power (e.g., voltage, current or power) via one or more unselected antennas 20. This may advantageously improve the operation of the RFID device 12*a*, for example increasing range. As discussed in more detail below, the logic 27 may employ a one or more threshold values in selecting between the antennas 20 or selecting neither of the antennas 20. For example, the logic 27 may employ a first threshold or minimum level to ensure that the lower voltage, current or power is sufficient to operate the RFID device 12*a* to backscatter or otherwise transmit. Additionally, or alternatively, the logic 27 may employ a second threshold to determine whether even the higher voltage(s), current(s) or power is sufficient to operate the RFID device 12*a* to backscatter or otherwise transmit.

Advantageously, the DC voltages resulting from the rectification of the RF voltages by each of the front ends 26 may be serially added to power the RFID device 12*a*.

The RFID device 12*a* may further include one or more nonvolatile memories 29. The nonvolatile memories 29 may be readable, and coupled to supply information stored therein to the front ends 26 for modulating the carrier wave responses 18. Optionally, the nonvolatile memories may be writeable one or more times. The nonvolatile memories may take a variety of forms including programmable read only memory (PROM), electronically programmable read only memory (EPROM), electrically erasable programmable memory (EEPROM) and/or flash memory.

Figure 2:
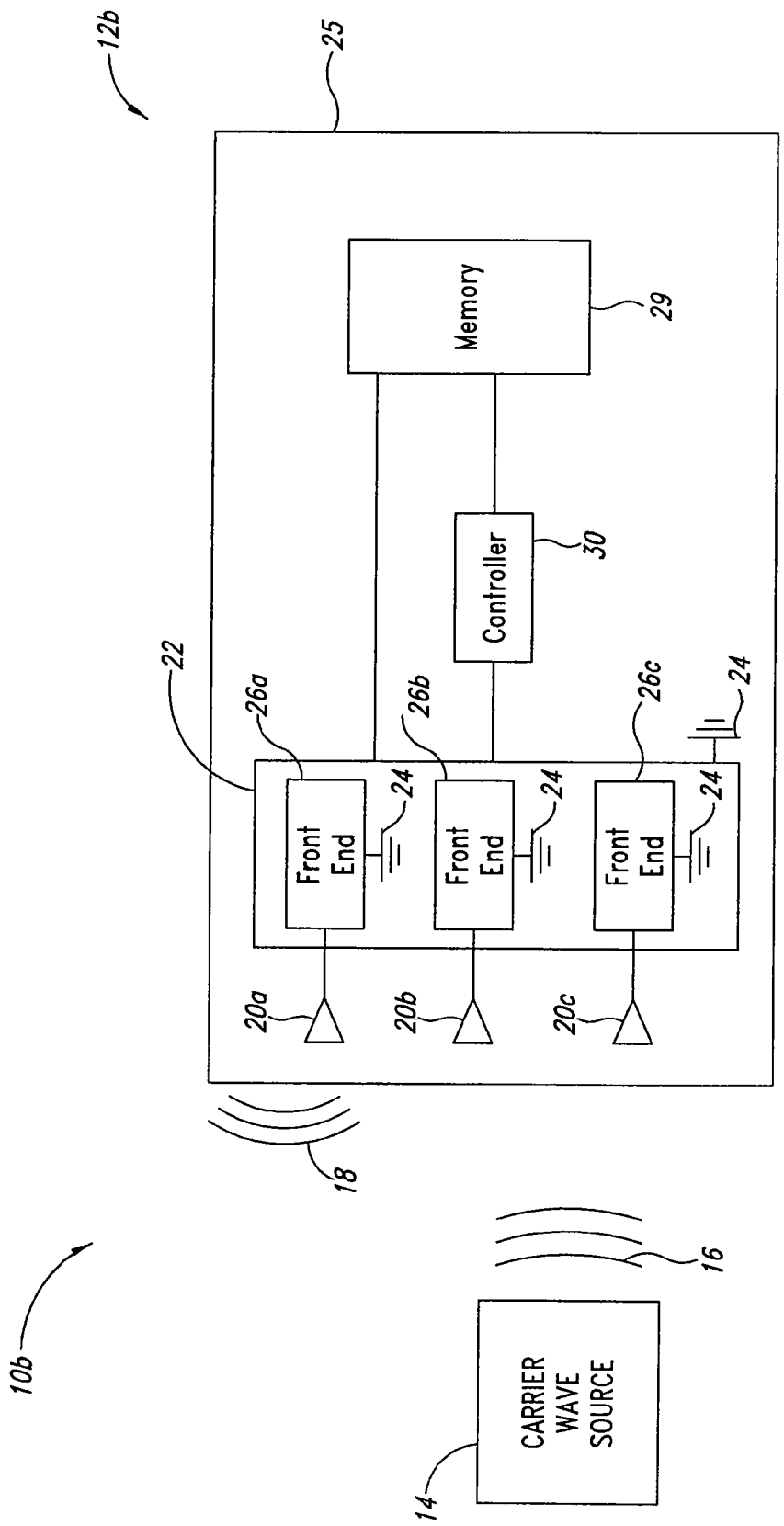
FIG. 2 is a schematic diagram of a radio frequency identification (RFID) system including an RFID device and a remotely located carrier wave source, according to another illustrated embodiment.

FIG. 2 shows an RFID system 10*b* comprising an RFID device 12*b* and a remotely located carrier wave source 14, according to another illustrated embodiment. Many of the structures and operations of the RFID system 10*b* are identical to or similar to those of the RFID system 10*a* (FIG. 1), hence common acts and structures are identified by the same reference numbers. Only significant differences in operation and structure are described below.

In contrast to the first embodiment, the RFID device 12 includes three antennas 20*a*, 20*b*, 20*c* (collectively 20) and three respective front ends 26*a*, 26*b*, 26*c* (collectively 26). The RFID device 12 also includes a controller 30, for example a microcontroller, microprocessor, digital signal processor (DSP), application specific integrated circuit (ASIC) and/or field programmable gate array (FPGA). The controller 30 is configured to select between one of the at least two antennas 20, or to select neither antenna 20, based at least in part on an amount of power being received by the respective antennas 20. The amount of power may, for example, be represented or otherwise indicated by a voltage, current or power received by the antenna 20 or provided by the respective front end 26 in response to the receipt of the carrier waves 16. As discussed in more detail below, the controller 30 permits the RFID device 12*b* to backscatter or otherwise transmit via the selected antenna 20, while receiving power (e.g., voltage, current or power) via one or more unselected antennas 20. This may advantageously improve the operation of the RFID device 12*b*, for example increasing range. As discussed in more detail below, the controller 30 may employ a one or more threshold values in selecting between the antennas 20 or selecting neither of the antennas 20. For example, the controller 30 may employ a first threshold or minimum level to ensure that the lower voltage, current or power is sufficient to operate the RFID device 12*b* to backscatter or otherwise transmit. Additionally, or alternatively, the controller 30 may employ a second threshold to determine whether even the higher voltage(s), current(s) or power is sufficient to operate the RFID device 12*b* to backscatter or otherwise transmit.

Figure 3:
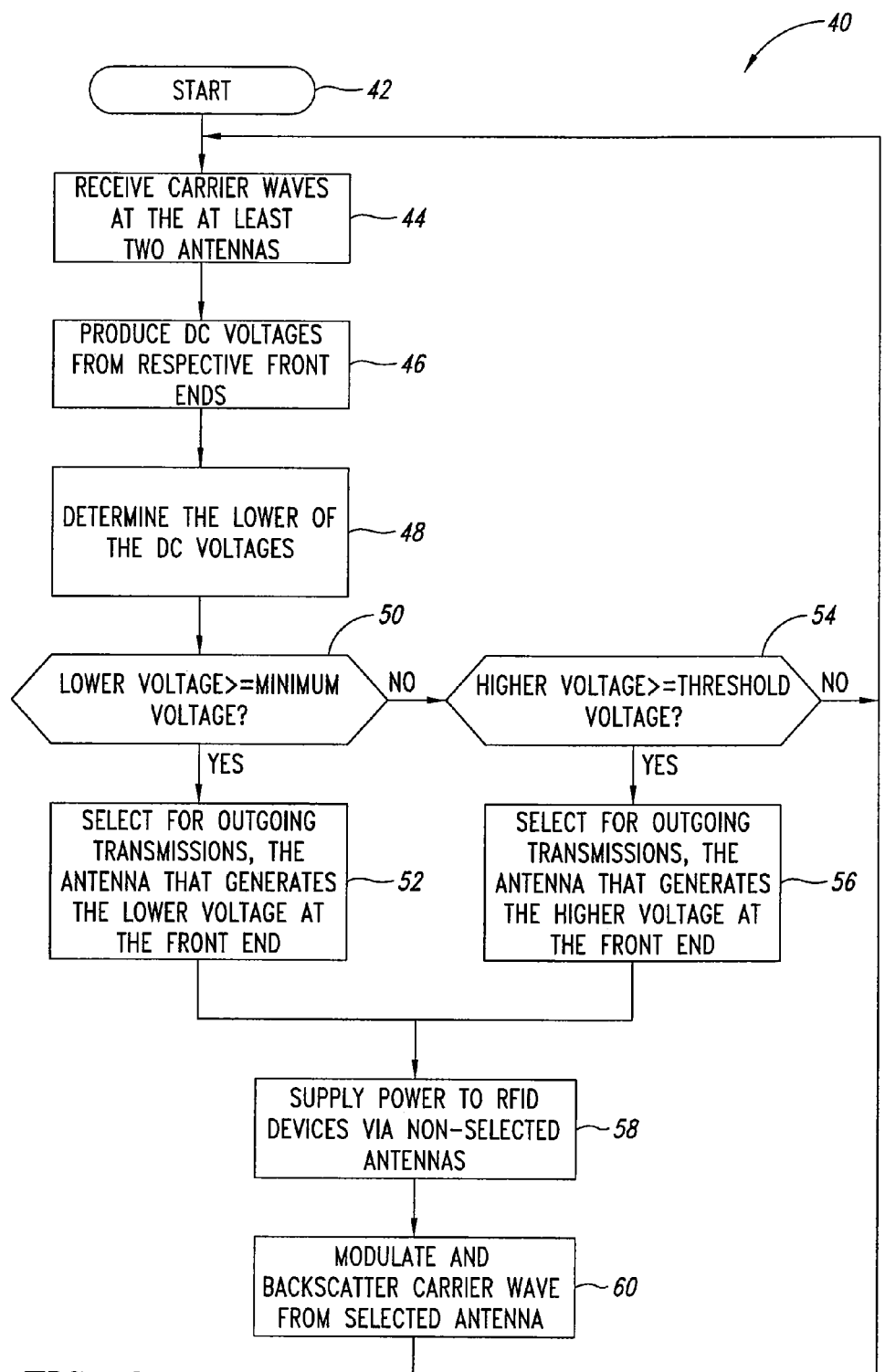
FIG. 3 is a flowchart of a method for operating the RFID device, according to one illustrated embodiment.

FIG. 3 shows a method 40 of operating the RFID devices 12*a*, 12*b* (collectively 12) of FIGS. 1 and 2, according to one illustrated embodiment.

The method 40 starts at 42, for example in response to the activation of the carrier wave source 14. The carrier wave source 14 transmits the carrier waves 16 as modulated signals with periods of unmodulated carrier.

At 44, the carrier waves 16 are received at the at least two antennas 20 of the RFID device 12. At 46, the RF voltages developed on the antenna terminals upon receipt of the carrier waves 16 are rectified by the front ends 26 of the passive power supply circuit 22. The resulting DC voltages are electrically serially added to supply power to the RFID device 12.

At 48, the logic 27 of the passive power supply circuit 22 or the controller 30 determines which antenna 20 is supplying the lower of the voltages to the front ends 26. The voltages are attributable to receipt of the carrier wave 16 by the respective antennas 20 from the carrier wave source 14.

To ensure that the lower of the voltages is sufficient to operate the RFID device 12, the passive power supply circuit 22 optionally compares the lower of the voltages to a minimum voltage (e.g., 0.75V-3V) at 50. If the lower voltage is greater than or equal to the minimum voltage, control passes to 52. Otherwise, control passes to 54.

In response to determining the lower of the voltages, and optionally determining that the lower of the voltages is sufficient to operate the RFID device 12, the logic 27 or controller 30 selects the antenna 20 that is supplying the lower voltage at the respective front end 26 for outgoing transmissions of the carrier wave responses 18 at 52. Selection may, for example, include activating or deactivating one or more physical or logical switches, for example switches of the respective front ends 26. Control then passes to 58.

Where the lower of the voltages is insufficient to operate the RFID device 12, the logic 27 or controller 30 optionally determines whether the higher voltage or at least one of the higher voltages is sufficient to operate the device by comparing the higher voltage or voltages to a threshold voltage (e.g., 0.5V, 0.1V, 0V, etc.) at 54. If the higher voltage(s) is greater than or equal to the threshold voltage, control passes to 56. Otherwise, none of the antennas 20 are selected for outgoing transmissions. Control passes back to 44 and the RFID device 12 waits to receive further carrier waves 16 from the carrier wave source 14 via the antennas 20.

At 56, the antenna 20 that supplies the higher voltage at the respective front end 26 is selected for outgoing transmissions of the carrier wave responses 18. Selection may, for example, include activating or deactivating one or more physical or logical switches, for example switches of the respective front ends 26. Control then passes to 58.

At 58, the front ends 26 corresponding to the non-selected antennas 20 supply voltage to power the RFID device 12. During this period, the front end 26 of the selected antenna 20 modulates and backscatters the carrier wave 16 at 60, as carrier wave response 18 from the selected antenna 20. As noted above, the front end 26 may modulate the carrier wave 16 by varying the impedance of the respective antenna 20 according to conventional methods in the RFID arts.

Control passes back to 44 where the RFID device 12 receives further carrier waves 16 from the carrier wave source 14 via the antennas 20.

Figure 4:
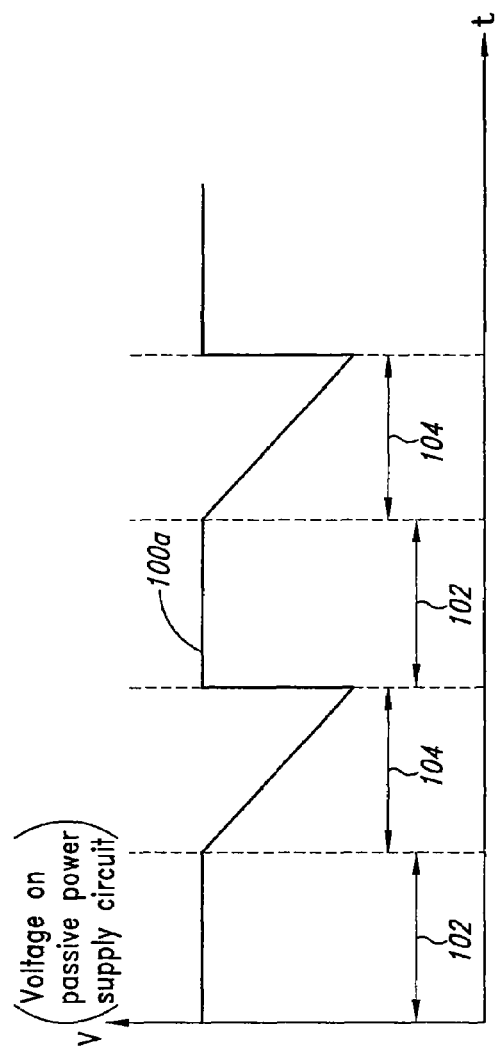
FIG. 4 is a graph of voltage versus time illustrating an exemplary voltage on a passive power supply circuit during conventional operation of an RFID device which backscatters using all antennas.

FIG. 4 shows a plot illustrating an exemplary voltage 100a from a conventional passive power supply circuit during conventional operation of an RFID device which backscatters using all antennas. The voltage 100a is constant during periods 102 when there is no backscattering. The voltage 100a drops significantly during periods 104 when backscattering is occurring since the passive power supply circuit is not able to maintain the voltage 100a while the antennas and front ends are employed for backscattering.

Figure 5:
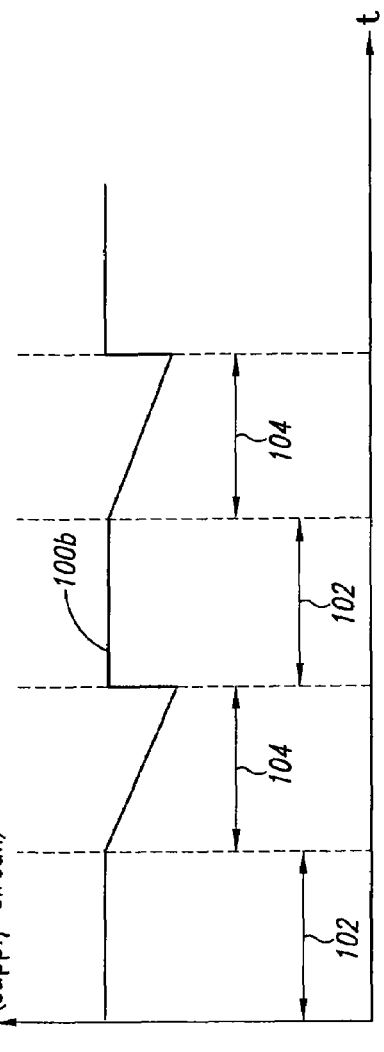
FIG. 5 is a graph of voltage versus time illustrating an exemplary voltage on a passive power supply circuit during operation of the RFID device which backscatters using only a selected antenna and receives power via an unselected antenna, according to one illustrated embodiment.

FIG. 5 shows a plot illustrating an exemplary voltage 100b from the passive power supply circuits 22 described above, during operation of the RFID device 12 which backscatters using a selected antenna 20a, while receiving power via an unselected antenna 20b, 20c, according to one illustrated embodiment. The drop in voltage during periods 104 of backscattering, illustrated in FIG. 5, is noticeable less than that illustrated in FIG. 4. This is because the passive power supply circuit 22 is able to maintain the voltage 100b by using at least one of the antennas 20b and front ends 26b to receive the carrier wave 16, while the selected antenna 20a and front end 26a backscatters the carrier wave response 18.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other automatic data collection devices not necessarily the exemplary RFID devices generally described above.

For instance, while the passive power supply circuit 22 may supply sufficient power to operate the RFID device 12 without the use of active power supply sources or power storage devices (e.g., battery cells, fuel cells, and/or ultracapacitors), some embodiments, may employ one or more active power supply sources in addition to the passive power supply circuit 22.

Also for instance, it will be apparent to those of skill in the art that the acts of the method 40 may be performed in a different order. It will also be apparent to those of skill in the art that the method 40 may omit some acts and/or may include additional acts.

Further, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A radio frequency identification (RFID) device operable to derive power from a carrier wave source that is separate and distinct from the RFID device, the RFID device comprising:
   at least two antennas configured to receive carrier waves from the carrier wave source; and
   an RFID circuit including a passive power supply circuit configured to rectify at least some of the carrier waves received via the at least two antennas to provide power to the RFID circuit, the RFID circuit configured to select which of the at least two antennas to employ for outgoing transmissions, if any, based at least in part on an indication of an amount of power being received at the RFID device via respective ones of the antennas, and the passive power supply circuit further configured to modulate at least some of the carrier waves received via the at least two antennas with information and backscatter the modulated carrier waves via the selected one or more of the antennas, if any, wherein the RFID circuit is configured to select for the outgoing transmissions the antenna of the at least two antennas that receives a lower of the amounts of power.

2. The RFID device of claim 1 wherein the passive power supply circuit includes at least two front ends coupled to respective ones of the at least two antennas, each of the front ends operable to rectify the carrier waves received via the respective one of the antennas and to modulate the carrier waves that are backscattered via the respective one of the antennas.

3. The RFID device of claim 2, further comprising:
   a ground line, wherein the at least two front ends are electrically coupled to the ground line.

4. The RFID device of claim 2 wherein respective DC voltage resulting from rectification of the carrier waves by each of the two front ends are serially added by the passive power supply circuit to provide the power for the RFID device.

5. The RFID device of claim 1 wherein the RFID circuit includes a microcontroller configured to compare the indication of the amount of power being received via the respective antennas, and to select for outgoing transmissions, the antenna of the at least two antennas that receives the lower of the amounts of power.

6. The RFID device of claim 1 wherein the passive power supply circuit comprises logic that is configured to compare the indication of the amount of power being received via the respective antennas, and to select for outgoing transmissions, the antenna of the at least two antennas that receives the lower of the amounts of power.

7. The RFID device of claim 1 wherein the indication of the amount of power being received via the respective antennas is indicative of a voltage.

8. The RFID device of claim 7 wherein the RFID circuit comprises logic that is configured to compare the voltage being generated via the respective antennas from the carrier wave received from the carrier wave source to a threshold voltage, and to select none of the antennas for outgoing transmissions if the generated voltage of each of the antennas is below the threshold voltage.

9. The RFID device of claim 8 wherein the threshold voltage is zero volts DC.

10. The RFID device of claim 1 wherein the passive power supply circuit is operable to electrically couple in series a voltage generated by receipt of the carrier waves by at least one of the at least two antennas with a voltage generated by receipt of the carrier waves by another of the at least two antennas.

11. The RFID device of claim 1, further comprising:
a nonvolatile memory coupleable to provide information stored in the nonvolatile memory to at least one of the front ends of the passive power supply circuit to modulate the carrier waves.

12. A radio frequency identification (RFID) device operable to derive power from a carrier wave source that is separate and distinct from the RFID device, the RFID device comprising:
at least two antennas configured to receive carrier waves from the carrier wave source; and
an RFID circuit including a passive power supply circuit configured to rectify at least some of the carrier waves received via the at least two antennas to provide power to the RFID circuit, the RFID circuit configured to select which of the at least two antennas to employ for outgoing transmissions, if any, based at least in part on an indication of an amount of power being received at the RFID device via respective ones of the antennas, and the passive power supply circuit further configured to modulate at least some of the carrier waves received via the at least two antennas with information and backscatter the modulated carrier waves via the selected one or more of the antennas, if any, wherein the RFID circuit comprises logic that is configured to compare an indication of a voltage being received via the respective antennas, and to select for outgoing transmissions, the antenna of the at least two antennas that receives a lower of the voltages.

13. A radio frequency identification (RFID) device operable to derive power from a carrier wave source that is separate and distinct from the RFID device, the RFID device comprising:
at least two antennas configured to receive carrier waves from the carrier wave source; and
an RFID circuit including a passive power supply circuit configured to rectify at least some of the carrier waves received via the at least two antennas to provide power to the RFID circuit, the RFID circuit configured to select which of the at least two antennas to employ for outgoing transmissions, if any, based at least in part on an indication of an amount of power being received at the RFID device via respective ones of the antennas, and the passive power supply circuit further configured to modulate at least some of the carrier waves received via the at least two antennas with information and backscatter the modulated carrier waves via the selected one or more of the antennas, if any, wherein the RFID circuit comprises logic that is configured to compare an indication of a voltage being received via the respective antennas from the carrier wave received from the carrier wave source, and to select for outgoing transmissions the antenna of the at least two antennas that generates a lower of the voltages if the generated voltage is at least equal to a minimum voltage, and to otherwise select for outgoing transmissions, the antenna of the at least two antennas that generates a higher of the voltages.

14. A method of operating a radio frequency identification (RFID) device, the method comprising:
receiving carrier waves at a first and a second antenna of the RFID device;
rectifying the received carrier waves to power the RFID device;
selecting which of at least the first and the second antennas to employ for outgoing transmissions, if any, based at least in part on a number of values indicative of an amount of power being received at the RFID device via respective ones of at least the first and the second antennas, wherein selecting which of the at least the first and the second antennas to employ for outgoing transmissions includes comparing the values indicative of the amount of power being received at the RFID device via the respective ones of the first and the second antennas, and selecting for outgoing transmissions, the antenna of the first and the second antennas that receives a lower of the amounts of power; and
backscattering a modulated carrier wave from the RFID device via the selected one of at least the first and the second antennas, if any, the modulated carrier wave modulated with information stored in the RFID device.

15. The method of claim 14 wherein rectifying the received carrier waves to power the RFID device includes generating respective DC voltages.

16. The method of claim 14 wherein rectifying the received carrier waves to power the RFID device further includes supplying DC voltages from respective ones of a first front end and a second front end of the RFID device.

17. The method of claim 16, further comprising:
electrically serially adding the DC voltages from each of the respective front ends of the RFID device.

18. A method of operating a radio frequency identification (RFID) device, the method comprising:
receiving carrier waves at a first and a second antenna of the RFID device;
rectifying the received carrier waves to power the RFID device;
selecting which of at least the first and the second antennas to employ for outgoing transmissions, if any, based at least in part on a number of values indicative of an amount of power being received at the RFID device via respective ones of at least the first and the second antennas, wherein selecting which of the at least the first and the second antennas to employ for outgoing transmissions includes comparing the values indicative of a voltage being supplied via the first and the second antennas from the carrier waves, and to select for outgoing transmissions an antenna of the first and the second antennas that supplies a lower of the voltages if the supplied voltage is at least equal to a minimum voltage, and to otherwise select for outgoing transmissions, the antenna of the first and the second antennas that supplies a higher of the voltages; and backscattering a modulated carrier wave from the RFID device via the selected one of at least the first and the second antennas, if any, the modulated carrier wave modulated with information stored in the RFID device.

19. The method of claim 18 wherein selecting which of the at least the first and the second antennas to employ for outgoing transmissions includes comparing the values indicative of a voltage being supplied via the first and the second antennas from the carrier waves to a threshold voltage, and to select none of the first and the second antennas for outgoing transmissions if the supplied voltage of each of the first and the second antennas is below the threshold voltage.

20. The method of claim 18 wherein selecting which of the at least the first and the second antennas to employ for outgoing transmissions includes comparing the values indicative of a voltage being supplied via the first and the second antennas from the carrier waves to a threshold voltage, and to select none of the first and the second antennas for outgoing transmissions if the supplied voltage of each of the first and second antennas is zero volts DC.

21. A radio frequency identification (RFID) device operable to derive power from a carrier wave source that is separate and distinct from the RFID device, the RFID device comprising:

at least two antennas for receiving carrier waves from the carrier wave source; and means for modulating at least some of the carrier waves received via the at least two antennas with information, selecting which of the at least two antennas to employ for outgoing transmissions, if any, based on at least in part a number of values indicative of an amount of power being received at the RFID device via respective ones of the antennas, and backscattering the modulated carrier waves via the selected one or more of the antennas, if any, wherein the means for modulating at least some of the carrier waves is configured to compare the values indicative of the amount of power being received via the respective antennas, and to select for outgoing transmissions, the antenna of the at least two antennas that receives a lower of the amounts of power.

22. The RFID device of claim 21 wherein the means for modulating at least some of the carrier waves is powered via a voltage supplied by receipt of the carrier waves by at least one of the at least two antennas.

23. The RFID device of claim 21 wherein the means for modulating at least some of the carrier waves comprises at least two front ends coupled to respective ones of the at least two antennas.

24. The RFID device of claim 21 wherein each of the two antennas are coupled to respective front ends of the means for modulating which rectify the carrier waves received from the carrier wave source to supply a DC voltage to the RFID device.

25. The RFID device of claim 24 wherein the DC voltages resulting from rectification of the carrier waves by each of the two front ends are serially added to power the means for modulating at least some of the carrier waves.

26. The RFID device of claim 21 wherein the values indicative of the amount of power being received via the respective antennas are indicative of voltages.

27. The RFID device of claim 21 wherein the means for modulating at least some of the carrier waves is configured to compare the values indicative of a voltage being generated via the respective antennas from the carrier wave received from the carrier wave source to a threshold voltage, and to select none of the antennas for outgoing transmissions if the supplied voltage of each of the antennas is below the threshold voltage.

28. The RFID device of claim 27 wherein the threshold voltage is zero volts DC.

29. A radio frequency identification (RFID) device operable to derive power from a carrier wave source that is separate and distinct from the RFID device, the RFID device comprising:

at least two antennas for receiving carrier waves from the carrier wave source; and means for modulating at least some of the carrier waves received via the at least two antennas with information, selecting which of the at least two antennas to employ for outgoing transmissions, if any, based on at least in part a number of values indicative of an amount of power being received at the RFID device via respective ones of the antennas, and backscattering the modulated carrier waves via the selected one or more of the antennas, if any, wherein the means for modulating at least some of the carrier waves is configured to compare the values indicative of a voltage being supplied via the respective antennas from the carrier wave received from the carrier wave source, and to select for outgoing transmissions the antenna of the at least two antennas that supplies a lower of the voltages if the supplied voltage is at least equal to a minimum voltage, and to otherwise select for outgoing transmissions, the antenna of the at least two antennas that supplies a higher of the voltages.

30. The RFID device of claim 29 wherein the means for modulating at least some of the carrier waves is operable to electrically couple in series a voltage supplied by receipt of the carrier waves by at least one of the at least two antennas with a voltage supplied by receipt of the carrier waves by another of the at least two antennas.

* * * * *

UNITED STATES PATENT AND TRADEMARK OFFICE
CERTIFICATE OF CORRECTION

PATENT NO. : 7,579,955 B2
APPLICATION NO. : 11/464038
DATED : August 25, 2009
INVENTOR(S) : Vijay Pillai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 325 days.

Signed and Sealed this

Fourteenth Day of December, 2010

David J. Kappos
*Director of the United States Patent and Trademark Office*